No. 656,095. Patented Aug. 14, 1900.
J. B. CONRAD.
PLATE FOR SECONDARY BATTERIES.
(Application filed Mar. 9, 1900.)
(No Model.)
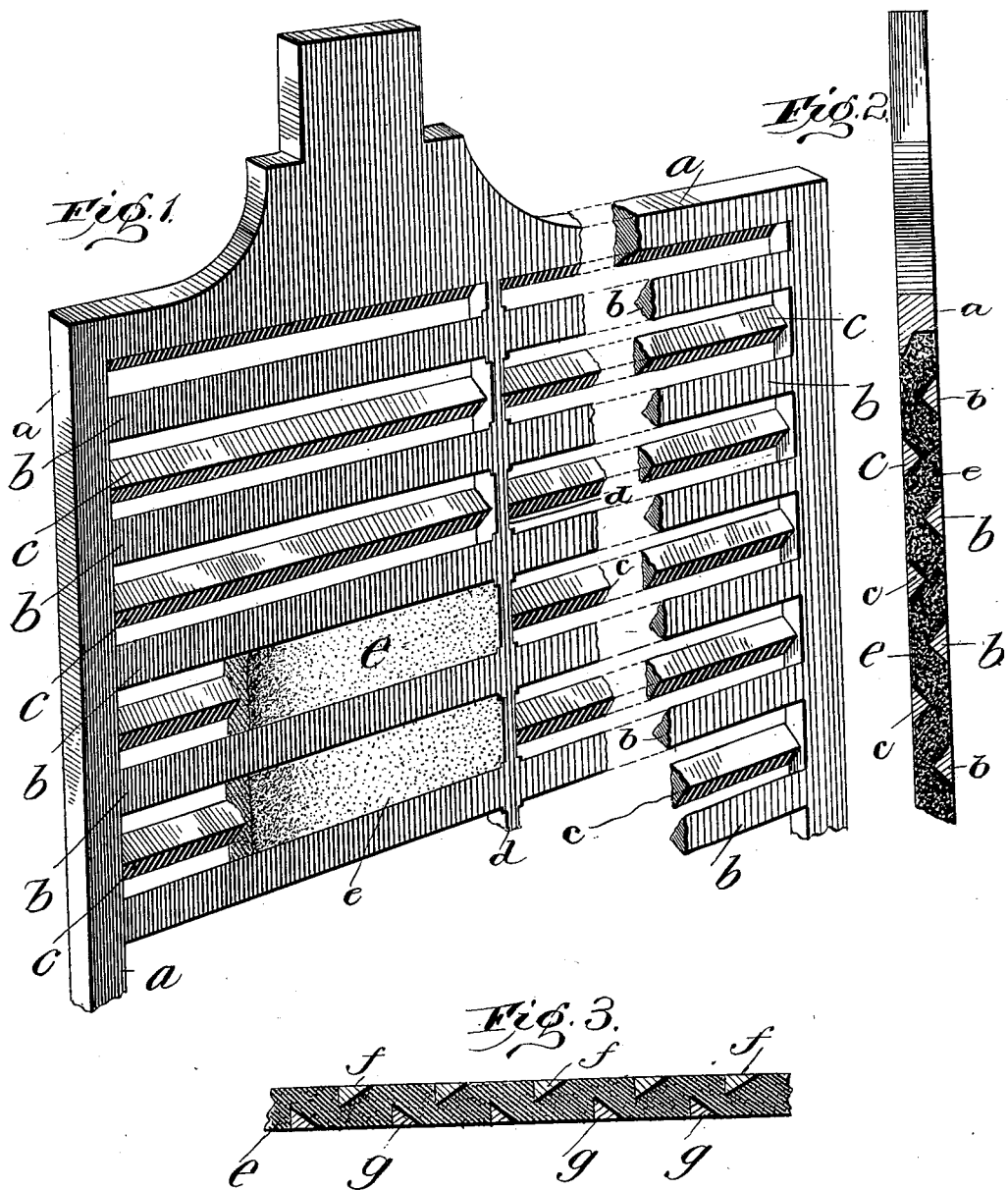
Witnesses
J. M. Fowler Jr.
L. C. Hills
Inventor
John B. Conrad,
By Alexander & Dowell
Attorneys

UNITED STATES PATENT OFFICE.

JOHN BELL CONRAD, OF CHICAGO, ILLINOIS, ASSIGNOR TO THE HEWITT-LINDSTROM MOTOR COMPANY, OF SAME PLACE.

PLATE FOR SECONDARY BATTERIES.

SPECIFICATION forming part of Letters Patent No. 656,095, dated August 14, 1900.

Application filed March 9, 1900. Serial No. 8,009. (No model.)

*To all whom it may concern:*

Be it known that I, JOHN BELL CONRAD, of Chicago, in the county of Cook and State of Illinois, have invented certain new and useful Improvements in Plates for Storage Batteries; and I hereby declare that the following is a full, clear, and exact description thereof, reference being had to the accompanying drawings, which form part of this specification.

This invention is an improvement in plates for storage batteries; and the objects of the invention are to produce a novel skeleton plate or grid that will be of less weight and will contain more active material than the forms of plate hitherto used of like size and which shall also be of such construction that the active material shall be continuous from the top to the bottom of the plate and will be securely held by the bars of the plate, and, further, to so construct the plate that it will not be affected by heavy discharges, nor can it be short-circuited by reason of the bending of the bars, which is a great defect in skeleton battery plates or grids heretofore made. These several advantages are attained in the preferred construction of the plate hereinafter shown and described, which enables me to obtain greater efficiency from a battery of a given size than has been heretofore obtainable.

The invention therefore consists in the novel construction of the plate set forth in the appended claims and hereinafter described with reference to the accompanying drawings, wherein—

Figure 1 is a perspective view of a portion of a battery-plate constructed in accordance with my invention and very much enlarged, so as to more clearly illustrate the novel construction thereof. Fig. 2 is a vertical section through such plate on line 2 2, Fig. 1. Fig. 3 is a view similar to Fig. 2, showing a slight modification of the form of the transverse bars.

Referring to said drawings, the plates are preferably cast of lead, as usual, with an exterior or frame portion $a$, the side members of which frame are connected by opposite series of transverse bars $b\ c$. These bars are triangular in cross-section and are arranged alternately, bars $b$ being at one side or face of the plate and bars $c$ at the opposite side or face thereof. The outer faces or bases of these bars $b\ c$ are respectively flush with and form part of the opposite broad faces of the plate, while the apices of the bars $b\ c$ face inwardly and extend to about the median plane of the plate. These bars $b\ c$ are practically independent and extend unbrokenly from one side of the plate to the other; but in large plates the bars may be braced at intervals by vertical cross pieces or partitions $d$, which are parallel with the sides of the plate and give rigidity thereto. The number of these cross-pieces would of course depend upon the size and contour of the plate. These partitions divide the active material in the plate into vertical strips or sections. The adjoining bars $b$ are separated a short distance corresponding to a little more than the width of their bases or outer faces, and the bars $c$ are similarly separated and are arranged alternately with or intermediate bars $b$ when viewed from the side of the plate.

It will be observed by reference to Fig. 2 that the space between the triangular bars $b\ c$ forms a continuous tortuous zigzag passage from one end of the plate to the other, in which passage the active material $e$ is packed. Thus there is a continuous mass of active material $e$ extending from the bottom to the top of the plate, which will give a very ready discharge and from which a heavy discharge can be obtained without the danger of breaking the active material or short-circuiting the battery.

If the bars $b$ or $c$ should bend under a heavy discharge, it will not affect the continuity of the mass of active material, nor will it necessarily cause any breakage of the active material, which is a frequent cause of short-circuiting in the ordinary forms of storage batteries.

By reason of the peculiar construction of the plate the active material is locked thereto, as it were, by dovetails opposite each opening in the surface of the plate (see Fig. 2) in the most advantageous and secure manner possible.

Practically with the construction of plate shown in Figs. 1 and 2 these plates can be made of the same dimensions as the ordinary plates, while weighing less than the latter. For instance, a plate five by eight inches weighs an ounce and a half less and will hold three or four ounces more active material than the ordinary plates of like dimensions.

In Fig. 3 the relative arrangement and triangular shape of the bars $f$ and $g$ are substantially retained; but in this modification the inner and lower angle of the bars is the longest and the upper angle of the bars is the shortest, so that the bars are flat on top and the longest angle is on the under side. This construction is good, but not so good as that already described.

Obviously the construction and arrangement of the bars $b\ c$ can be retained, while the exterior configuration or shape of the plate as a whole can be modified to suit the battery wherein the plate is to be used—that is, the plate as a whole may be of rectangular, oblong, circular, or other desired form.

My plate is materially different from the "grids" or "gratings" which have been heretofore used and which, generally speaking, consist of two opposite similar castings fastened together so as to bind the material between them. The separate castings for these grids have been of various forms, but usually are formed with a series of openings, and the metal surrounding these openings may be said to roughly resemble bars; but in every grid, so far as I am aware, the opposite members are so formed that when put together, as they must be in order to retain the material, the bars or frames on the opposite sides of the grid will intersect each other. It is usual in constructing such grids to cast them in opposite halves, which are afterward secured together; but neither half is adapted to contain material. My plate is elemental and unitary, its bars are not intersecting, and it can be readily cast as a unit without expensive molds and can be readily filled with the active material.

What I claim is—

1. The herein-described plate for storage batteries composed of a frame and two oppositely-facing series of non-intersecting individual and distinct bars each bar being triangular in cross-section and connected at its ends to the opposite sides of the frame, all the bars in both series being parallel but alternate bars being members of opposite series and disposed on opposite faces of the plate and facing in opposite directions, and the apices of all the bars pointing inwardly, substantially as and for the purpose described.

2. The herein-described battery element composed of a frame and two opposite series of similar non-intersecting triangular bars respectively arranged on opposite faces of the plate, the bars in each series being parallel and extending from side to side of the frame, the broader angles or bases of said bars being flush with and forming part of the outer surfaces of the plate and the apices of all the bars pointing inwardly and extending to about the median line or plane of the plate, and vertical partitions extending from top to bottom of the plate and intersecting and connecting all the bars in both series, substantially as and for the purpose described.

3. The herein-described battery element composed of a frame and two series of similar non-intersecting triangular transverse distinct bars each series being arranged at opposite sides of the plate; all the bars in both series being parallel and extending from side to side of the frame with their apices pointing inwardly and extending to about the median line or plane of the plate, and alternate bars being of opposite series: with a continuous mass of active material extending from the top to the bottom of the plate in the longitudinal spaces between and transversely of said bars, all substantially as and for the purpose described.

In testimony that I claim the foregoing as my own I affix my signature in presence of two witnesses.

JOHN BELL CONRAD.

In presence of—
C. L. CHRISTESON,
W. H. WARVEL.